United States Patent Office 2,900,418
Patented Aug. 18, 1959

2,900,418

PRODUCTION OF ALKYL PHENOLS

George Huett and William O. Ranky, Chicago, Ill., assignors, by mesne assignments, to The Stepan Chemical Company, Chicago, Ill., a corporation of Delaware No Drawing. Application June 20, 1957
Serial No. 667,046

2 Claims. (Cl. 260—624)

This invention relates to alkylation of phenols, and more particularly, to the butylation of phenols which may be unsubstituted or alkyl substituted.

The alkylation of phenols by reaction of a phenol (substituted and unsubstituted) with an olefin is a known reaction which may be catalyzed using, for example, sulfuric acid and/or Lewis catalyst, such as $BF_3$, $ZnCl_2$, $SnCl_4$, HF, etc. The instant invention is particularly concerned with the reaction of isobutylene and a phenol to obtain a butylated phenol using a novel catalyst, namely, iodine.

Of particular interest in the practice of the instant invention is a reaction which may be represented by the following equation:

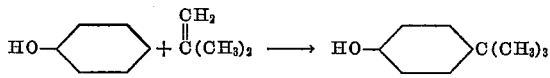

The product, p-tert.-butyl phenol, is particularly useful in a number of fields, being used as an intermediate in the manufacture of varnish and lacquer resins, as a soap antioxidant, as an ingredient in de-emulsifiers for oil field use, and in motor oil additives, among other things. The isomers, o-tert.-butyl phenol and m-tert.-butyl phenol are not as useful and ordinarily the p-tert.-butyl phenol is separated therefrom. One of the difficulties in the prior art resides in the fact that most reaction processes for the production of tertiary butyl phenols would produce only about two-thirds p-tert.-butyl phenol, with the remainder o-tert.-butyl phenol or m-tert.-butyl phenol, which were in the nature of waste products or at least by-products which must be removed. In some instances it is possible to carry out a subsequent reaction of the tertiary butyl phenol product in the nature of a rearrangement reaction by heat treatment with sulfuric acid and/or active clays whereby the yield of the p-tert.-butyl phenol is increased. This additional step is avoided by the instant invention because the instant invention results in the formation of a product that is substantially pure p-tert.-butyl phenol (about 98% p-tert.-butyl phenol, no m-tert.-butyl phenol and only traces of o-tert.-butyl phenol).

It will also be appreciated that the instant invention may be used to prepare di- and tri-tertiary butyl phenols. In addition, the instant reaction may be used to butylate other alkyl phenols, such as cresol. In particular, the instant invention affords the unique advantage of producing an excellent yield of di-tertiary butyl cresol, which is useful as an antioxidant. This reaction may be shown by the following equation:

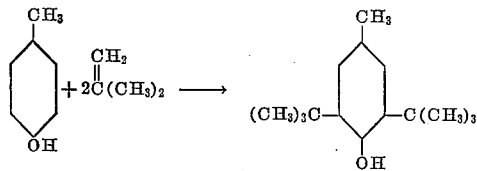

It will also be appreciated that other $C_1$-$C_4$ alkyl groups may be used in place of the methyl group in cresol as a starting material.

It is, therefore, an important object of the instant invention to provide an improved alkylation process for phenols and more particularly to provide an improved catalyst for the alkylation of phenols.

Yet another object of the instant invention is to provide an improved method of reacting isobutylene with a phenol to obtain the corresponding tertiary butyl phenol using iodine as a catalyst.

Still another important object of the instant invention is to provide an improved process for the production of p-tert.-butyl phenol which comprises reacting isobutylene with phenol in the presence of iodine.

Yet a further object of the instant invention is to provide an improved process for the production of di-tertiary butyl cresol, which comprises reacting p-cresol with two molecular proportions of mols of isobutylene in the presence of iodine.

Other objects, features and advantages of the present invention will become apparent from the following detailed disclosure of the instant invention.

The instant invention consists in a method of reacting a phenol with an olefin, and specifically a method of carrying out the following reaction:

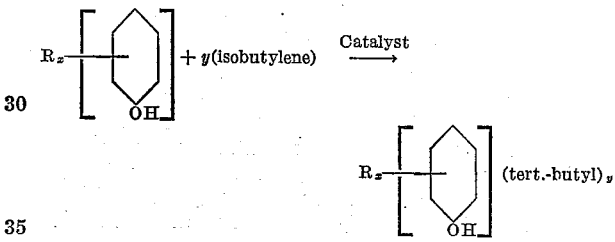

wherein each R is from the group consisting of H and $C_1$-$C_{12}$ alkyl, $x$ is 1 to 2, $y$ is 1 to 3, the total number of alkyl groups in the product is 1 to 3, and the catalyst is iodine.

The olefin may be any $C_1$-$C_{12}$ aliphatic monoolefinic compound, such as ethylene, propylene, butylene . . . nonylene, decylene, dodecylene, etc.

From the foregoing it is apparent that one of the reactants, namely, the phenol may be described as having the following structural formula:

It will be seen that this phenol can be unsubstituted phenol if each R is H. If, however, one or both of the R's are not H's, then these radicals are $C_1$-$C_{12}$ alkyl, which means they may be methyl, ethyl, propyl, isopropyl, butyl, isobutyl or tertiary butyl, up to dodecyl. As will be noted, the number of R groups is 1 to 2 (which is indicated by the symbol "$x$"), so that not more than two alkyl groups may be present on the starting phenol. Such groups would ordinarily be in the ortho and/or para positions. If the instant reaction is used to add more than one tertiary butyl radical, it will be appreciated that the first radical is added in the para position and the remaining two added in the remaining ortho positions. Accordingly, the preferred mono-alkyl phenol for use in the practice of the invention is a p-alkyl phenol. The alkyl phenols which may be used in the practice of the instant invention include cresol, xylol, ethyl phenol, ethyl methyl phenol, etc., propyl phenol, propyl methyl phenol, etc., isopropyl phenol, butyl phenol, isobutyl phenol, tertiary butyl phenol, up to dodecyl phenol.

As indicated, $y$ mols of olefin are employed and $y$ plus the number of alkyl groups on the starting phenol may range from 1 to 3. In other words, the final product will have at least one alkyl group on the benzene nucleus and not more than three. In the case of p-tert.-butyl phenol only one alkyl group is on the final product; and in the case of di-tertiary butyl cresol a total of three alkyl groups are on the phenol nucleus.

A key to the present invention resides in the use of iodine as the catalyst. The iodine is used, of course, in the ordinary catalytic amounts which may range from a minimum effective amount of about 0.5% of the weight of the starting phenol reactant to a maximum amount of about 15% of the weight of the starting phenol reactant (above which no appreciable increase of the catalytic effect is obtained). As used herein, the terms "part" and "percent" mean parts and percent by weight unless otherwise specified. The percentage of catalyst is based upon the weight of the starting phenol reactant rather than the product. In the case of the reaction for the production of p-tert.-butyl phenol, it is found that the preferred amount of catalyst is relatively high at about 10%; whereas in the case of the production of di-tertiary butyl cresol it is found that the preferred amount of catalyst is relatively low, in the neighborhood of about 1%. Effective reaction is obtained using catalytic amounts throughout the entire range in each case, however.

The reaction conditions employed are, in general, the ordinary alkylation reaction conditions involving the reaction of a phenol and an olefin. The instant catalyst is advantageous in that it permits the use of somewhat lower reaction temperatures than are ordinarily used and it provides a fast reaction at these lower temperatures. The temperatures which may be employed in the practice of the instant invention range from as low as about 120° F. to a maximum practical temperature of about 300° F. (above which no appreciable advantages are obtained). Preferably the reaction temperature is 200–220° F. The pressure used is, of course, the pressure generated by the reactants (and particularly isobutylene) at the reaction temperatures.

As in the case of most alkylation reactions, there are a number of variables which affect the outcome of the reaction such as the length of reaction time, temperature, the percentage of catalyst used and variations in the proportions of reagents employed. In general, the phenol and isobutylene are employed in substantially the molar proportions desired in the reaction product. In other words, if p-tert.-butyl phenol is the desired reaction product the reactants are employed in equimolar proportions; whereas, if di-tertiary butyl cresol is the desired product, one mol of cresol is reacted with about two mols of isobutylene. In order to insure complete reaction, usually a slight excess of isobutylene is employed, since the unreacted excess can be easily removed at the end of the reaction.

The instant invention has a number of advantages. Probably one of the most important of which with respect to p-tert.-butyl phenol is the fact that the reaction is almost entirely orientative for the para position. The reaction is fast at relatively low temperatures. The yield of butylated phenol is particularly high; and in the case of the production of p-tert.-butyl phenol the yield of this compound in the absence of isomers is unusually high. Such yield is about 98% giving a product with a melting point of 97.5–99° C. (whereas the pure product has a melting point of 99° C.). As still another advantage, the product may be preferably recovered by solvent extraction and the catalyst may be readily separated by a number of procedures which will be described hereinafter so that it may be reused.

The invention may be demonstrated by carrying out any of the following examples:

*Example 1*

A three neck vessel is fitted with an agitator, condenser, gas dispersion tube and thermometer. The top of the condenser is connected to a trap filled with sulfuric acid (to absorb any unreacted isobutylene). The vessel is equipped with temperature control means for heating or cooling.

The vessel is charged with 564 grams (6 mols) of molten phenol to which is added 60 grams (0.236 mol) of iodine. The iodine dissolves completely in the phenol. The temperature of the vessel is raised to 200–220° F. and maintained substantially at that temperature during the subsequent isobutylene addition. The isobutylene is added at a rate slow enough to permit the gas to react with the phenol (which is controlled with the help of the sulfuric acid trap). Since the reaction is exothermic moderate cooling of the vessel is required to keep the reaction at the desired temperature. The addition of isobutylene is continued until the stoichiometric amount of 336.6 grams (6 mols) of isobutylene has been reacted, which requires about 1½–2 hours. The addition of isobutylene is then stopped and the system is maintained at 200–220° F. for 15–30 minutes longer to insure completion of the reaction.

Although the iodine may be removed by a number of ways, in this case removal of the iodine is effected by drawing a slight vacuum on the system and bubbling nitrogen gas through the reaction mixture while maintaining the same at a temperature of 160–220° F. The vapors thus being removed are directed into a molten phenol trap in which the iodine is absorbed; and the resulting phenol-iodine solution is available for the next batch.

The resulting crude product is dissolved in about twice its volume of petroleum ether and the p-tert.-butyl phenol is crystallized therefrom. The yield is 97–98% based upon the phenol starting material (i.e. theoretical yield possible) and the melting point of the product is 97–99° C. The product is about 98% pure p-tert.-butyl phenol.

Substantially the same results are obtained if the solvent extraction is carried out using n-hexane, n-pentane, n-heptane, cyclohexane, mineral spirits or the like, from which the phenol reaction product is crystallized after extraction.

The iodine may be removed from the reaction product and recovered in a number of ways. For example, steam distillation of the crude product may be carried out to remove the iodine. Flash distillation with alcohol may be used in a similar manner. Also, the iodine may be extracted from the crude product with a saturated aqueous solution of potassium iodide, from which the iodine is readily removed by steam distillation. The potassium iodide solution is also recovered, or the potassium iodide itself remains after steam distillation so that it may be reused. Also, vacuum distillation with some fresh phenol added may be used to carry over the iodine, which results in an iodine phenol mixture. It has been found, however, that ordinary separation by distillation reduces the yield of p-tert.-butyl phenol, so that ordinary distillation of the reaction product is not recommended.

*Example 2*

A reaction is carried out that is the same as that described in connection with Example 1 except that the amounts of reactants used were 282 parts of phenol, 179.3 parts of isobutylene and 30 parts of iodine and the melting point of the resulting product was 97–98° C. and the yield based on the phenol starting material was 97.1%.

*Example 3*

A reaction was carried out that is the same as that described in Example 1 except that the amounts of reactants used were 282 grams (3 mols) of phenol, 181.1 grams (3.22 mols) if isobutylene and 30 grams (0.118 mol) of iodine and the resulting product had a melting point of 99° C. and the yield based upon the phenol starting material was 98%.

Example 4

A reaction is carried out that is the same as that described in Example 1 except that the amounts of ingredients used were 282 grams (3 mols) of phenol, 186.7 grams (3.33 mols) of isobutylene, and 20 grams (0.079 mol) of iodine and the melting point of the resulting product was 97–99° C. and the yield was 87.4%. The catalyst concentration here was 7.09% of the weight of the phenol starting material.

Example 5

A reaction is carried out that is the same as that described in Example 1 except that the ingredients used were 282 grams (3 mols) of phenol, 168 grams (3.0 mols) of isobutylene and 15 grams (0.059 mol) of iodine, which is 5.32% of the weight of the phenol starting material; and the resulting product at a melting point of 97–99° C., but the yield was only 71.4% based on the weight of the phenol starting material.

Example 6

A procedure is carried out that is the same as that described in Example 1 except that the amounts of reactants used are 282 grams (3 mols) of phenol, 179.5 grams (3.20 mols) of isobutylene, and 10 grams (0.039 mol) of iodine, which is only 3.55% of the weight of the phenol starting material; and the resulting product had a melting point of 98–99° C., but the yield was only 16.6% based on the weight of the phenol starting material.

The foregoing examples demonstrate clearly that approximately 10% (based upon the weight of the phenol starting material) is the best concentration for iodine in this reaction.

The product in each case was in the form of snow-white needles.

Example 7 o,p-di-Tertiary butyl phenol is prepared by carrying out a procedure that is the same as that described in connection with Example 1 except that 12 mols of isobutylene are added over a period of about 15–20 hours while maintaining a temperature of about 250° F. Even more drastic conditions are required to obtain an appreciable yield of the tri-tertiary butyl phenol.

Example 8

A reaction is carried out that is the same as that described in connection with Example 1 except that the reaction vessel is charged with 3 mols of p-cresol, in which is dissolved 3 grams of iodine and to which is then added 6 mols of isobutylene over a period of 15–20 hours. The resulting products crystallized from petroleum ether is o,o-di-tertiary butyl para-cresol.

It will be understood that modifications and variations may be effected without departing from the spirit and scope of the novel concepts of the present invention.

We claim as our invention:

1. A method of producing p-tertiary butyl phenol that comprises heating together at 200–220° F. one mol of phenol and one mol of isobutylene in the presence of iodine in an amount equal to 7–10% of the phenol.

2. A method of producing p-tertiary butyl phenol that comprises heat-reacting at 200–220° F. one mol of phenol with one mol of isobutylene in the presence of iodine, as a catalyst the amount of iodine used being approximately 10% by weight of the phenol used.

References Cited in the file of this patent

UNITED STATES PATENTS

| | | |
|---|---|---|
| 2,189,805 | Kyrides | Feb. 13, 1940 |
| 2,560,666 | Stevens et al. | July 17, 1951 |